United States Patent
Lee et al.

(10) Patent No.: US 11,048,110 B2
(45) Date of Patent: Jun. 29, 2021

(54) CURVED LIQUID CRYSTAL DISPLAY DEVICE INCLUDING FLAT SECTIONS

(71) Applicant: LG Display Co., Ltd., Seoul (KR)

(72) Inventors: Yong-Seok Lee, Paju-si (KR); Min-Jin Lee, Paju-si (KR); Ju-Sang Rhim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 25 days.

(21) Appl. No.: 16/204,292

(22) Filed: Nov. 29, 2018

(65) Prior Publication Data

US 2019/0179192 A1    Jun. 13, 2019

(30) Foreign Application Priority Data

Dec. 7, 2017   (KR) .................. 10-2017-0167238

(51) Int. Cl.
   *G02F 1/1333*       (2006.01)
   *F21V 8/00*         (2006.01)

(52) U.S. Cl.
   CPC ....... *G02F 1/133308* (2013.01); *G02B 6/009* (2013.01); *G02B 6/0055* (2013.01); *G02B 6/0073* (2013.01); *G02B 6/0083* (2013.01); *G02F 1/133314* (2021.01); *G02F 2201/56* (2013.01); *G02F 2202/28* (2013.01)

(58) Field of Classification Search
   CPC combination set(s) only.
   See application file for complete search history.

(56) References Cited

U.S. PATENT DOCUMENTS

2011/0043724 A1*  2/2011  Kim ................ G02B 6/0055
                                                    349/65
2015/0378188 A1   12/2015  Moon et al.
(Continued)

FOREIGN PATENT DOCUMENTS

CN        105276444 A      1/2016
CN        105408266 A      3/2016
(Continued)

OTHER PUBLICATIONS

Search Report dated Dec. 27, 2019, issued in corresponding Taiwanese Patent Application No. 107141719.
(Continued)

*Primary Examiner* — Lauren Nguyen
(74) *Attorney, Agent, or Firm* — Morgan, Lewis & Bockius LLP

(57) ABSTRACT

A curved liquid crystal display device includes: a curved liquid crystal panel including a first flat section and a second flat section in a longitudinal direction and a curved section between the first and second flat sections; a curved backlight unit which is disposed under the curved liquid crystal panel and includes a glass light guide plate having first and second flat sections and a curved section; a curved guide panel which surrounds edges of the curved liquid crystal panel and the curved backlight unit and includes first and second flat sections and a curved section; and a curved glass cover bottom which is disposed at a back surface of the curved backlight unit and includes first and second flat sections and a curved section, wherein the curved guide panel and the curved glass cover bottom are outermost structures of the curved liquid crystal display device.

18 Claims, 5 Drawing Sheets

(56) References Cited

U.S. PATENT DOCUMENTS

| | | | | |
|---|---|---|---|---|
| 2016/0122225 A1* | 5/2016 | Wada | ............ | C03B 23/0235 |
| | | | | 428/174 |
| 2016/0216435 A1 | 7/2016 | Park et al. | | |
| 2016/0363715 A1* | 12/2016 | Ha | ............ | G02B 6/0036 |
| 2017/0192267 A1* | 7/2017 | Wang | ............ | G02F 1/1368 |
| 2018/0004254 A1 | 1/2018 | Park et al. | | |
| 2018/0081232 A1* | 3/2018 | Park | ............ | G02F 1/13306 |
| 2018/0101047 A1* | 4/2018 | Li | ............ | G02B 6/0088 |

FOREIGN PATENT DOCUMENTS

| | | |
|---|---|---|
| CN | 106249472 A | 12/2016 |
| CN | 107250879 A | 10/2017 |
| TW | 201712409 A | 4/2017 |

OTHER PUBLICATIONS

Office Action dated Apr. 25, 2021, issued in corresponding Chinese Patent Application No. 201811430676.9.

\* cited by examiner light incident portion opposite-light incident portion

CURVED LIQUID CRYSTAL DISPLAY DEVICE INCLUDING FLAT SECTIONS

CROSS-REFERENCE TO RELATED APPLICATIONS

The present application claims the priority benefit of Korean Patent Application No. 10-2017-0167238, filed on Dec. 7, 2017, which is hereby incorporated by reference in its entirety for all purposes as if fully set forth herein.

BACKGROUND

Technical Field

The present invention relates to a curved liquid crystal display (LCD) device, and more particularly, to a curved LCD device that is thin and has a light weight and a narrow bezel.

Discussion of the Related Art

Recently, as the society has entered a full-fledged information age, the display field for processing and displaying a large amount of information has been rapidly developed, and thus various display devices have been developed and spotlighted.

As examples of the display devices, there are liquid crystal display (LCD) devices, plasma display panel (PDP) devices, field emission display (FED) devices, electroluminescence display (ELD) devices, organic light emitting diodes (OLEDs), and the like which have high performance in having a small thickness and a light weight, in which power consumption is low, and which are rapidly substituting for conventional cathode ray tubes (CRT).

As illustrated in FIG. 1, a curved LCD device module 10 in which a surface of an LCD device module is curved has recently risen rapidly as a next generation display device, and the curved LCD device module 10 may improve an immersion level of a user, display a more realistic image, and allow the user to feel comfortable.

In the curved LCD device module 10, since a liquid crystal panel does not include a light emitting element, a separate light source is required to express difference in transmissivity, and to this end, a backlight unit, in which a light source is embedded, is disposed below the liquid crystal panel.

The backlight unit includes a light emitting diode (LED) assembly having LEDs arranged at an edge of one side thereof in a longitudinal direction and an LED printed circuit board (PCB) on which the LEDs are mounted, a reflective plate having a white or silver color, a light guide plate placed on the reflective plate, and an optical sheet disposed above the reflective plate.

Meanwhile, the light guide plate of the backlight unit which mostly affects a thickness of the curved LCD device module 10 is formed of a polymethyl methacrylate (PMMA) material, formed in a flat shape, forcibly curved, and applied to the curved LCD device module 10.

Accordingly, since the curved LCD device module 10 needs a modularization frame having a high rigidity to withstand a repulsive force due to bending the forcibly curved light guide plate, the curved LCD device module 10 cannot have a light weight and a small thickness.

In addition, the curved LCD device module 10 is required to have a light weight, a small thickness, a wide display region, and a narrow bezel region as a non-display region, as possible.

Particularly, the curved LCD device module 10 is accommodated in a front cover, and a rear cover is coupled to the front cover to form a finished LCD device product such as a television (TV) set and a monitor. However, in spite of efforts to form a lightweight and thin LCD device, since the number of elements forming the LCD device is too large, it is difficult to manufacture the lightweight and thin curved LCD device.

In addition, the curved LCD device module 10 has disadvantages in that a material cost is high and assembly and disassembly processes of the curved LCD device are complex.

SUMMARY

Accordingly, embodiments of the present disclosure are directed to a curved liquid crystal display (LCD) device that substantially obviates one or more of the problems due to limitations and disadvantages of the related art.

An aspect of the present disclosure is to provide a curved LCD device having reduced weight and volume and a narrow bezel. Another aspect of the present disclosure is to reduce an assembly time period and a material cost in a process of a curved LCD device modularization.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a curved liquid crystal display device comprises: a curved liquid crystal panel including a first flat section and a second flat section which are flat in a longitudinal direction and a curved section between the first and second flat sections; a curved backlight unit which is disposed under the curved liquid crystal panel and includes a glass light guide plate having first and second flat sections and a curved section; a curved guide panel which surrounds edges of the curved liquid crystal panel and the curved backlight unit and includes first and second flat sections and a curved section; and a curved glass cover bottom which is disposed at a back surface of the curved backlight unit and includes first and second flat sections and a curved section, wherein the curved guide panel and the curved glass cover bottom are outermost structures of the curved liquid crystal display device.

In another aspect, a curved liquid crystal display device comprising: a first flat section and a second flat section which are flat in a longitudinal direction, and a curved section between the first and second flat sections; wherein the first flat section comprises a first portion of a curved glass cover bottom, a first portion of a curved guide panel, a first portion of a curved backlight unit, and a first portion of a curved liquid crystal panel stacked sequentially; the second flat section comprises a second portion of the curved glass cover bottom, a second portion of the curved guide panel, a second portion of the curved backlight unit, and a second portion of the curved liquid crystal panel stacked sequentially; the curved section comprises a curved portion of the curved glass cover bottom, a curved portion of the curved guide panel, a curved portion of the curved backlight unit, and a curved portion of the curved liquid crystal panel stacked sequentially; and wherein, the curved backlight unit comprises a curved glass light guide plate, and the curved guide panel and the curved glass cover bottom are outermost structures of the curved liquid crystal display device.

It is to be understood that both the foregoing general description and the following detailed description are explanatory, and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the various principles. In the drawings.

DETAILED DESCRIPTION

Hereinafter, embodiments according to the present invention will be described in detail with reference to the accompanying drawings.

Figure 1:
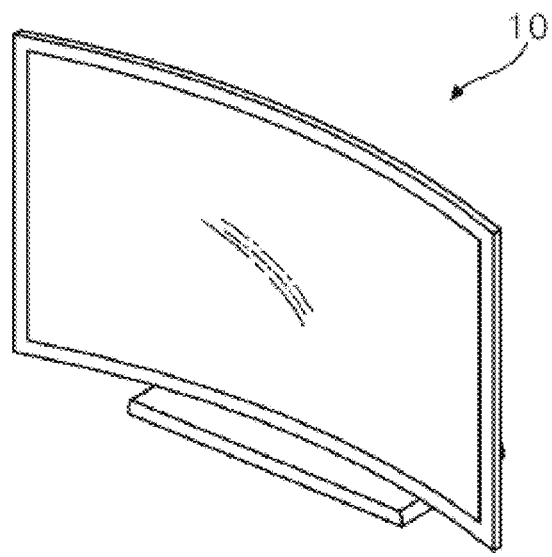
FIG. 1 is a perspective view schematically illustrating a curved liquid crystal display (LCD) according to the related art.
Figure 2:
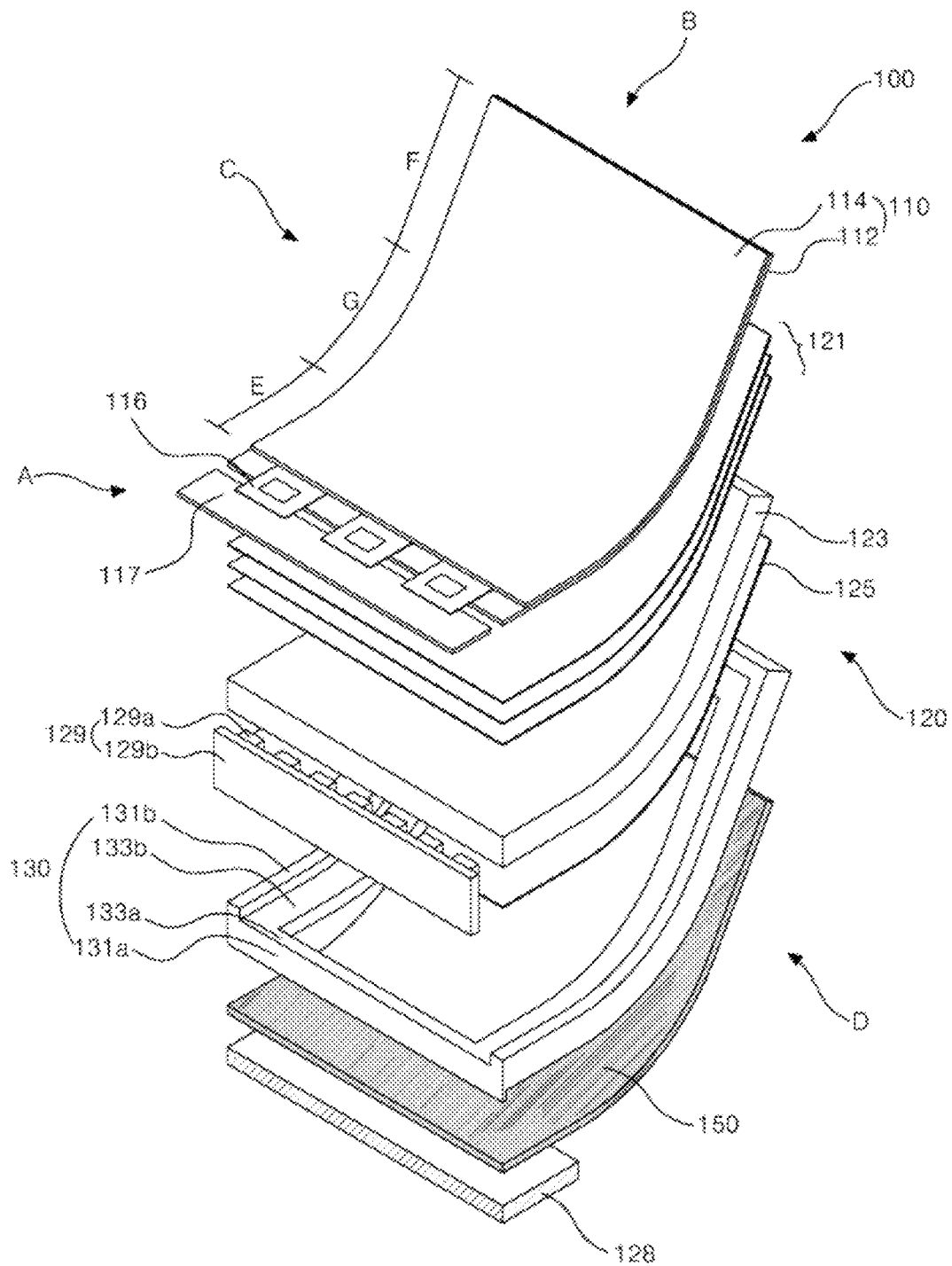
FIG. 2 is an exploded perspective view schematically illustrating a curved LCD device according to an embodiment of the present invention.

FIG. 2 is an exploded perspective view schematically illustrating a curved liquid crystal display (LCD) device according to an embodiment of the present invention.

As illustrated in the drawing, a curved LCD device 100 according to the embodiment of the present invention mainly includes a curved liquid crystal panel 110, a curved backlight unit 120, a curved guide panel 130, and a curved glass cover bottom 150.

Here, directions in the drawings are defined as follows for the sake of convenience in the description. When a display surface of the curved liquid crystal panel 110 faces in a forward direction, the curved backlight unit 120 is disposed below the curved liquid crystal panel 110, the curved glass cover bottom 150 is positioned at a back surface of the curved backlight unit 120 in a state in which the curved guide panel 130 in a rectangular frame shape surrounds edges of the curved backlight unit 120 and the curved liquid crystal panel 110, and the curved guide panel 130 and the curved glass cover bottom 150 are coupled and integrated.

In addition, in the curved liquid crystal panel 110 and the curved backlight unit 120, short edges perpendicular to a longitudinal direction are defined as first and second edge portions A and B, and long edges, which connect the first and second edges A and B, formed in the longitudinal direction are defined as third and fourth edge portions C and D.

The above-describe components will be described in more detail.

The curved liquid crystal panel 110 is a portion which serves the key role of image display and includes a first substrate 112 and a second substrate 114, which face and are bonded to each other, with a liquid crystal layer interposed therebetween.

Here, when the curved liquid crystal panel 110 is an active matrix type panel, although not illustrated in the drawing, a plurality of gate and data lines intersect in an inner surface of the first substrate 112, which is referred to as a lower substrate or array substrate, in order to define pixels, and thin film transistors (TFTs) are provided at intersections and are correspondingly connected to transparent pixel electrodes formed at the pixels.

In addition, color filters, for example, red (R), green (G), and blue (B) color filters corresponding to the respective pixels, and a black matrix which surrounds each color filter and shields non-display portions such as the gate lines, the data lines, and the TFTs are provided on an inner surface of the second substrate 114 referred to as an upper substrate or color filter substrate. In addition, transparent common electrodes which cover the color filters and the black matrix are provided on the second substrate 114.

In addition, polarizing plates 119a and 119b (see FIG. 3A) configured to selectively transmit specific light components are attached on outer surfaces of the first and second substrates 112 and 114.

The curved liquid crystal panel 110 is connected to a printed circuit board (PCB) 117 at a first edge corresponding to the first edge portion A using a connecting member 116 such as a flexible circuit board or tape carrier package (TCP).

In the curved liquid crystal panel 110, when the TFTs are selected by the gate line and are turned on according to an on/off signal of a gate driving circuit, a signal voltage of a data driving circuit is transmitted to the corresponding pixel electrode through the data line, and accordingly, an alignment direction of liquid crystal molecules is changed due to an electric field between the pixel electrode and the common electrode so that a difference in transmissivity occurs.

The curved liquid crystal panel 110 has a predetermined curvature and includes first and second flat sections E and F, which are flat along the third and fourth edges C and D in the longitudinal direction, and a curved section G between the first and second flat sections E and F.

Here, the curved section G is formed in a concavely curved shape with respect to a front side of the curved liquid crystal panel 110 at which an image is displayed.

In addition, the curved LCD device 100 according to the present invention includes a curved backlight unit 120 configured to supply light to the curved liquid crystal panel 110 such that a difference in transmissivity occurring at the curved liquid crystal panel 110 is revealed to the outside.

High brightness plane light generated by the curved backlight unit 120 is transmitted to the curved liquid crystal panel 110 to display an image on the curved liquid crystal panel 110.

The curved backlight unit 120 includes a light-emitting diode (LED) assembly 129 arranged along a first edge of the curved glass cover bottom 150 corresponding to the first edge portion A, a reflective plate 125, a glass light guide plate 123 placed on the reflective plate 125, and optical sheets 121 positioned above the glass light guide plate 123.

The LED assembly 129 positioned at the first edge of the curved glass cover bottom 150 is positioned at one side of the glass light guide plate 123 to face a light incident surface of the glass light guide plate 123 and includes a plurality of LEDs 129a and a PCB 129b on which the plurality of LEDs 129a are mounted to be spaced apart by a predetermined distance.

Here, the plurality of LEDs 129a emit light having red (R), green (G), and blue (B) colors toward the light incident surface of the glass light guide plate 123, and the plurality of red (R), green (G), and blue (B) LEDs 129a may be simultaneously turned on to mix colors so as to generate white light.

Recently, in order to improve a lighting efficiency and a brightness, the LED 129a including a blue LED chip having a high lighting efficiency and a high brightness is used and includes a phosphor of a cerium-doped yttrium aluminum garnet (YAG:Ce), that is, a yellow phosphor.

Blue light emitted from the LED chip is transmitted through the phosphor and mixed with yellow light emitted by the phosphor so as to generate white light.

Here, a temperature of the LEDs 129a of the LED assembly 129 rapidly increases according to a usage time, and the increase in temperature causes changes in a lifetime and brightness of the LED 129a.

Accordingly, in a case that the LEDs 129a are used as a light source of the curved backlight unit 120, one of the most important factors is a heat dissipation design for an increase in temperature of the LEDs 129a. In the curved backlight unit 120 according to the present invention, the PCB 129b on which a plurality of LEDs 129a of the LED assembly 129 are mounted is formed of a material having a high thermal conductivity such as a metal core printed circuit board (MCPCB) to effectively discharge heat generated by the LEDs 129a to the outside.

In addition, the curved backlight unit 120 further includes an LED housing 128 in contact with the PCB 129b to rapidly and effectively discharge high temperature heat generated by the LEDs 129a to the outside through the PCB 129b and the LED housing 128.

Here, the LED housing 128 according to the embodiment of the present invention is formed in a bar shape corresponding to the longitudinal direction of the LED assembly 129, is formed of a metal having a high thermal conductivity, and is in contact with a surface of the PCB 129b on which the LEDs 129a are mounted.

Accordingly, high temperature heat generated by the plurality of LEDs 129a is transferred to the PCB 129b and the LED housing 128 and is rapidly and efficiently discharged to the outside.

In the glass light guide plate 123, on which light emitted from the plurality of LEDs 129a of the LED assembly 129 is incident, light incident from the LEDs 129a is uniformly diffused to a large region of the glass light guide plate 123 while traveling inside the glass light guide plate 123 due to several instances of total reflection and is provided as plane light to the curved liquid crystal panel 110.

Here, since a rigidity of the glass light guide plate 123 is greater than that of a plastic light guide plate, the glass light guide plate 123 may be formed to have a predetermined curvature.

That is, the glass light guide plate 123 includes the first and second flat sections E and F, which are flat along the third and fourth edges C and D in the longitudinal direction, and the curved section G between the first and second flat sections E and F. The curved section G is formed in a concavely curved shape with respect to a light exit surface from which light incident inside the glass light guide plate 123 exits.

The first and second flat sections E and F and the curved section G of the glass light guide plate 123 correspond to the first and second flat sections E and F and the curved section G of the curved liquid crystal panel 110.

A lower surface of the glass light guide plate 123 may include a pattern having a specific shape to supply plane light. Here, the pattern may include various patterns such as an elliptical pattern, a polygonal pattern, and a hologram pattern to guide light incident inside the glass light guide plate 123, and the pattern is formed on the lower surface of the glass light guide plate 123 through a printing or injection method.

The reflective plate 125 is positioned at a back surface of the glass light guide plate 123 and improves a brightness of light by reflecting the light transmitted through the back surface of the glass light guide plate 123 toward the curved liquid crystal panel 110.

The optical sheets 121 above the glass light guide plate 123 may include a diffusion sheet and at least one light collecting sheet, and may further include various functional sheets such as a reflective polarizing film called a dual brightness enhancement film (DBEF).

Light passing through the glass light guide plate 123 is diffused or collected to be changed to high quality plane light while passing through the optical sheets 121 so that the plane light which is more uniform is incident on the curved liquid crystal panel 110.

Here, in the curved LCD device 100 according to the embodiment of the present invention, since the glass light guide plate 123 of the backlight unit 120 is formed of a glass material having high rigidity, and the glass light guide plate 123 includes the first and second flat sections E and F and the curved section each of the reflective plate 125 positioned under the glass light guide plate 123 and the optical sheets 121 positioned above the glass light guide plate 123 includes the first and second flat sections E and F and the curved section G corresponding to a shape of the glass light guide plate 123.

Accordingly, the backlight unit of the curved LCD device 100 according to the embodiment of the present invention is configured as the curved backlight unit 120.

The curved liquid crystal panel 110 and the curved backlight unit 120 are integrally modularized by the curved guide panel 130 and the curved glass cover bottom 150.

The curved guide panel 130 is formed in the rectangular frame shape to surround edges of the curved liquid crystal panel 110 and the curved backlight unit 120 including the glass light guide plate 123.

Here, a first edge of the curved guide panel 130 corresponding to the first edge portion A of the curved backlight unit 120 at which the LED assembly 129 is positioned includes a first vertical portion 131a, which surrounds an outer side of the PCB 129b of the LED assembly 129, and a first horizontal portion 133a which is perpendicularly bent from the first vertical portion 131a and surrounds an upper region of the LED assembly 129.

Accordingly, light emitted from the LED assembly 129 is concentrated toward the glass light guide plate 123 and prevented from leaking to an outside of the curved backlight unit 120.

In addition, each of the remaining three edges (that is, the edge B, C and D as shown in FIG. 2) of the curved guide panel 130 includes a second vertical portion 131b and a second horizontal portion 133b which protrudes inward from the second vertical portion 131b and classifies positions of the curved liquid crystal panel 110 and the curved backlight unit 120. As an example, the first edge portion A and the second edge portion B may be the shorter edges of the rectangular shaped curved guide panel 130, and the third edge C and the fourth edge D may be the longer edges of the rectangular shaped curved guide panel.

Here, a part of an edge of a back surface of the curved liquid crystal panel 110 is supported on the first horizontal portion 133a and the second horizontal portion 133b, the edge of the back surface of the curved liquid crystal panel 110 is attached and fixed to the first horizontal portion 133a and the second horizontal portion 133b by a first adhesive member 140a (see FIG. 3A) having adhesiveness, and side surfaces of the curved liquid crystal panel 110 are surrounded by the second vertical portions 131b of the three edges.

The curved guide panel 130 also includes the first and second flat sections E and F and the curved section G corresponding to the first and second flat sections E and F and the curved section G of each of the curved liquid crystal panel 110 and the curved backlight unit 120.

In addition, the curved glass cover bottom 150 which is a base for assembly of an entire structure of the curved LCD device 100 has a plate shape on which the curved backlight unit 120 is placed and is formed of a glass material.

The curved glass cover bottom 150 also includes the first and second flat sections E and F and the curved section G corresponding to the first and second flat sections E and F and the curved section G of each of the curved liquid crystal panel 110 and the curved backlight unit, and is attached to and integrated with the curved guide panel 130 by a second adhesive member 140b (see FIG. 3B) having adhesiveness.

In the curved LCD device 100 according to the embodiment of the present invention, the reflective plate 125, the glass light guide plate 123, and the optical sheets 121 are sequentially positioned above the curved glass cover bottom 150, and since the curved glass cover bottom 150 is fixedly attached to the curved guide panel 130 surrounding the edge of the curved backlight unit 120 by the second adhesive member 140b (see FIG. 3B), the curved guide panel 130 is integrated with the curved glass cover bottom 150.

Here, since the curved liquid crystal panel 110 is fixedly attached to the first and second horizontal portions 133a and 133b of the curved guide panel 130 by the first adhesive member 140a (see FIG. 3A), the curved liquid crystal panel 110 and the curved backlight unit 120 are integrally modularized by the curved guide panel 130 and the curved glass cover bottom 150.

Here, in the curved LCD device 100 according to the embodiment of the present invention, since a light guide plate of the curved backlight unit 120 is formed as the glass light guide plate 123, the glass light guide plate 123 has a high rigidity, and thus has a predetermined curvature.

Therefore, the lighter and thinner curved LCD device 100 can be realized.

That is, the light guide plate forming the backlight unit is generally formed of a light transmitting plastic material such as a poly methyl methacrylate (PMMA) resin, a methyl styrene (MS) resin, polystyrene (PS), polypropylene (PP), polyethylene terephthalate (PET), or polycarbonate (PC), and a light guide plate formed of a PMMA material is typically and widely used.

Although the plastic light guide plate has a high light transmissivity, a thickness of the light guide plate has to be thick to maintain a predetermined rigidity and the like, and the plastic light guide plate has features of a high thermal expansion rate and a high humidity swelling rate. Accordingly, in an LCD device including the plastic light guide plate formed of PMMA, PC, or PS, there are disadvantages in that there are limitations to reducing a weight and a thickness of the LCD device and disposing a light guide plate and a light source portion thereon, and a separate support structure is necessary.

Particularly, since the plastic light guide plate has to be forcibly bent to form the curved LCD device 100, a modularization frame having a high rigidity is needed to withstand a repulsive force due to bending of the light guide plate, thus a modularization frame having a high rigidity is needed, and it is difficult to form a lightweight and thin curved LCD device due to the high rigidity modularization frame.

However, since the curved LCD device 100 according to the embodiment of the present invention includes the glass light guide plate 123, the glass light guide plate 123 can be formed to have a predetermined curvature, and a high rigidity modularization frame for withstanding a repulsive force due to bending of the light guide plate is not needed.

That is, since the curved liquid crystal panel 110 and the curved backlight unit 120 can be modularized by the curved guide panel 130 and the curved glass cover bottom 150, the curved LCD device 100 according to the present invention can be formed to have a light weight and a small thickness.

In addition, the curved LCD device 100 according to the embodiment of the present invention is formed as a finished product which can be actually used by a user. Accordingly, the present invention can provide the curved LCD device 100 which has a lighter weight and a smaller thickness, and a manufacturing process thereof can be simplified. In addition, a manufacturing cost can be reduced.

That is, in the curved LCD device 100 according to the embodiment of the present invention, since each of the curved liquid crystal panel 110, the curved backlight unit 120, and the curved guide panel 130 and the curved glass cover bottom 150, which modularize the curved liquid crystal panel 110 and the curved backlight unit 120, includes the first flat section E, the curved LCD device 100 which is integrally modularized can be positioned and stand perpendicularly to a ground surface (or floor surface) by the first flat section E.

Here, since the curved glass cover bottom 150, which is a base for assembly of an entire structure of the curved LCD device 100, is formed of a glass material, and a back surface of the curved glass cover bottom 150 is painted, plated, or coated in black or a specific color, and outer sides of the first and second vertical portions 131a and 131b of the curved guide panel 130 are painted, plated, or coated in black or a specific color, the curved glass cover bottom 150 and the curved guide panel 130 form an exterior of a product, and thus the curved glass cover bottom 150 and the curved guide panel 130 serve as an external cover of a display device such as a notebook, a mobile device, and a TV set.

Accordingly, the curved LCD device 100 according to the embodiment of the present invention is formed as a finished product of an LCD device which can be used by a user.

Accordingly, the present invention can provide the curved LCD device 100 having a lighter weight and a smaller thickness, and a manufacturing process can be simplified. In addition, a manufacturing cost can be reduced.

More specifically, in the curved LCD device 100 according to the present invention, since the curved liquid crystal panel 110 and the curved backlight unit 120 are modularized by the curved guide panel 130 and the curved glass cover bottom 150, and the curved glass cover bottom 150 also serves as an external cover, a front cover (not shown) and a rear cover (not shown), which form conventional external covers, are not necessary.

As described above, since a plurality of components are not needed, there are effects of having a light weight and a small thickness. In addition, since separate components are not needed in front of the curved liquid crystal panel 110, a display region of the curved liquid crystal panel 110 is not hidden, and thus the curved LCD device 100 having a narrow bezel, in which the display region is widened and a bezel region as a non-display region is narrowed, can be provided.

Figure 3A:
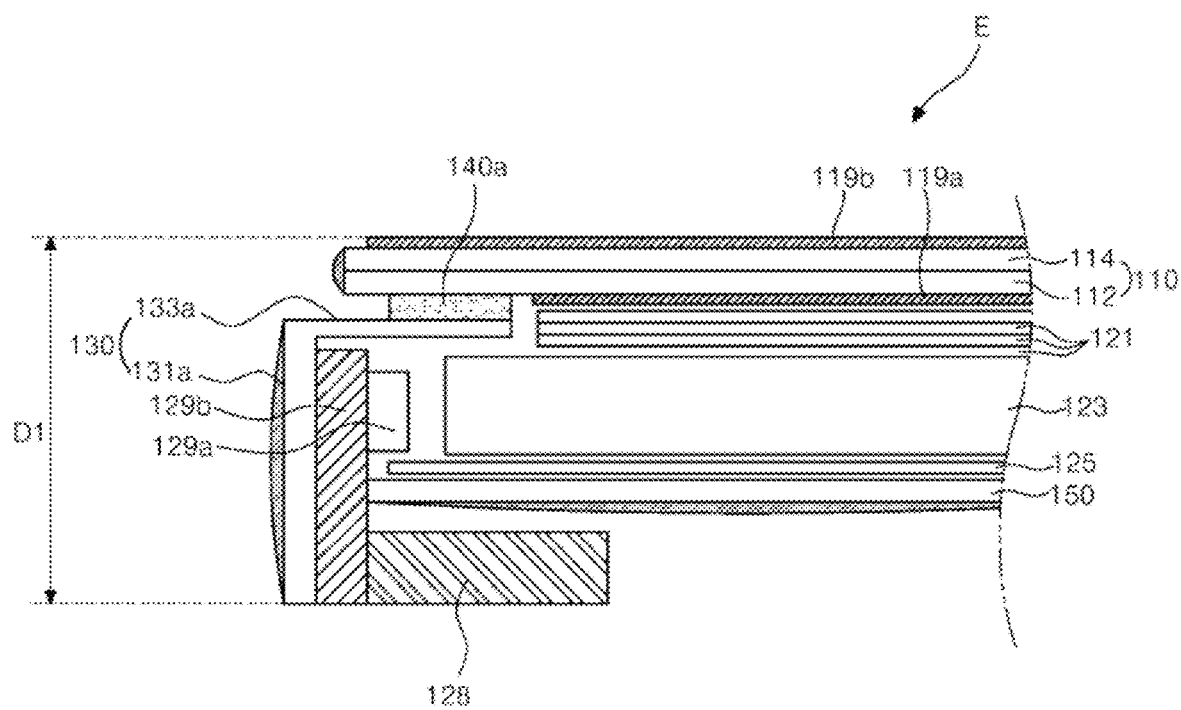
FIG. 3A is a schematic cross-sectional view illustrating a modularized first flat section of FIG. 2.
Figure 3B:
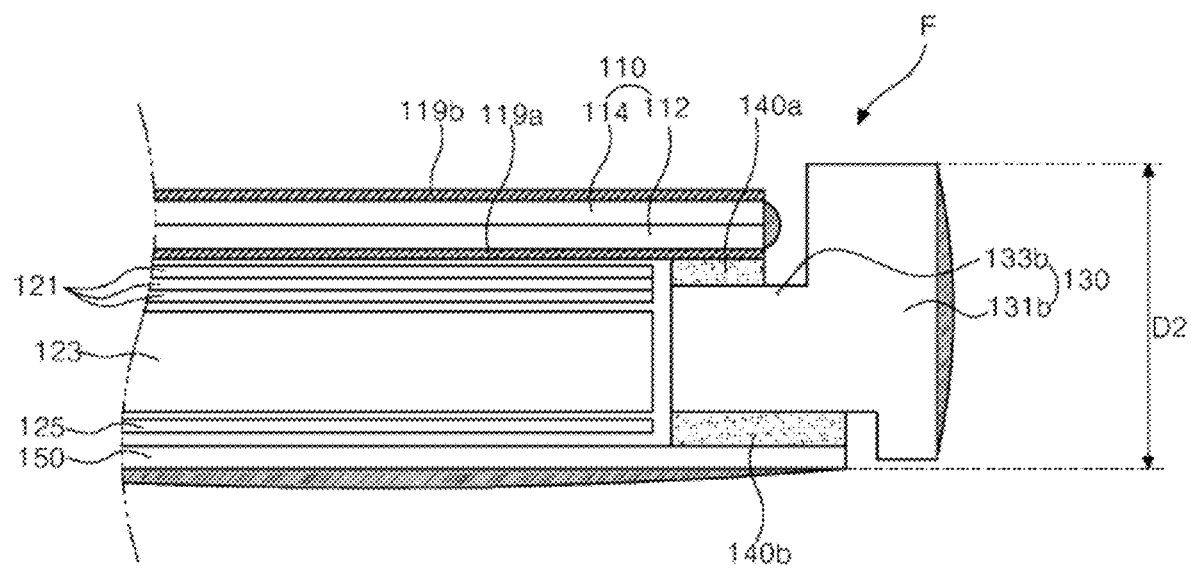
FIG. 3B is a schematic cross-sectional view illustrating a modularized second flat section of FIG. 2.

FIG. 3A is a schematic cross-sectional view illustrating the modularized first flat section of FIG. 2, and FIG. 3B is a schematic cross-sectional view illustrating the modularized second flat section of FIG. 2.

As illustrated in the drawings, in the curved LCD device 100 (see FIG. 2) according to the embodiment of the present invention, the curved backlight unit 120 (see FIG. 2) is formed by stacking the reflective plate 125, the glass light guide plate 123, the LED assembly 129 including the LEDs 129*a* and the PCB 129*b* on which the LEDs 129*a* are mounted, and the optical sheets 121 on the glass light guide plate 123.

In addition, the curved liquid crystal panel 110 in which the liquid crystal layer (not shown) is interposed between the first and second substrates 112 and 114 is positioned above the curved backlight unit 120 (see FIG. 2), and the polarizing plates 119*a* and 119*b* configured to transmit specific light components are attached on the outer surfaces of the first second substrates 112 and 114.

The curved backlight unit 120 (see FIG. 2) and the curved liquid crystal panel 110 are integrally modularized by the curved guide panel 130 and the curved glass cover bottom 150. More specifically, the reflective plate 125, the glass light guide plate 123, and the optical sheets 121 are sequentially positioned above the plate shaped curved glass cover bottom 150, and the LED assembly 129 is positioned at the first flat section E corresponding to the first edge portion A (see FIG. 2) such that the plurality of LEDs 129*a* face the light incident surface of the glass light guide plate 123.

Here, the PCB 129*b* of the LED assembly 129 protrudes under the back surface of the curved glass cover bottom 150 and is in contact with the bar shaped LED housing 128 positioned at the back surface of the curved glass cover bottom 150.

Accordingly, high temperature heat generated by the plurality of LEDs 129*a* is transferred to the PCB 129*b* and the LED housing 128 and is rapidly and efficiently discharged to the outside. Accordingly, the curved LCD device 100 (see FIG. 2) according to the present invention has an efficient heat dissipating design for the LED assembly 129 with the LED housing 128.

As described above, when the LED assembly 129, the reflective plate 125, the glass light guide plate 123, and the optical sheets 121 are sequentially placed on the curved glass cover bottom 150, the curved guide panel 130 surrounds the edge of the curved backlight unit 120 (see FIG. 2) including the LED assembly 129, the reflective plate 125, the glass light guide plate 123, and the optical sheets 121, and the curved guide panel 130 is integrated with the curved glass cover bottom 150.

That is, an outer side of the LED assembly 129 positioned at the first flat section E corresponding to the first edge portion A (see FIG. 2) is guided by the first vertical portion 131*a* provided at the first edge of the curved guide panel 130, and the upper region of the LED assembly 129 is covered and hidden by the first horizontal portion 133*a* perpendicularly bent from the first vertical portion 131*a*.

Here, the first horizontal portion 133*a* extends to an upper region of the light incident surface of the glass light guide plate 123 to cover and hide at least a portion of the upper region of the light incident surface of the glass light guide plate 123.

Accordingly, light emitted by the LED assembly 129 is concentrated toward the glass light guide plate 123 due to the first edge of the curved guide panel 130 and is prevented from leaking to an outside of the curved backlight unit 120.

In addition, side surfaces of the curved backlight unit 120 (see FIG. 2) are guided by the second vertical portion 131*b* provided on the second to third edges of the curved guide panel 130, and the edge of the back surface of the curved liquid crystal panel 110 is attached to the second horizontal portion 133*b* protruding inward from the second vertical portion 131*b* and the first horizontal portion 133*a* by the first adhesive member 140*a* so that the curved liquid crystal panel 110 is supported.

Here, since a back surface of the second horizontal portion 133*b* is attached to the curved glass cover bottom 150 by the second adhesive member 140*b*, the curved guide panel 130 and the curved glass cover bottom 150 are integrated.

Here, each of the first and second adhesive members 140*a* and 140*b* may be formed of an elastic resin but is not limited thereto. Alternatively, each of the first and second adhesive members 140*a* and 140*b* may be formed of a foam pad, an optical clear adhesive (OCA), a double side tape, or the like.

Since both of the first flat section E and the second flat section F are formed to be flat and the curved section G is provided between the first flat section E and the second flat section F, a back surface of the first flat section E is positioned to be pressed against a ground surface even without a separate support (not shown), and the third and fourth edges formed in the longitudinal direction can vertically fixedly stand the curved LCD device 100 (see FIG. 2).

Here, since the curved guide panel 130 is formed of a lightweight material such as PC, acrylonitrile butadiene styrene (ABS), or a PC/ABS compound, the curved LCD device 100 (see FIG. 2) according to the present invention can be formed to have a lighter weight.

In addition, a process cost of the curved guide panel 130 formed of the above-describe material can also be reduced, and since the outer sides of the first and second vertical portions 131*a* and 131*b* can be easily painted, plated, or coated in black or a specific color, the curved guide panel 130 itself can be formed as an exterior of a product.

In addition, since the back surface of the curved glass cover bottom 150 formed of the glass material is painted, plated, or coated in black or a specific color, the curved glass cover bottom 150 itself can be formed as an exterior.

Accordingly, the curved LCD device 100 (see FIG. 2) according to the embodiment of the present invention can be formed as a finished product of an LCD device which can actually be used by a user through the curved liquid crystal panel 110, the curved backlight unit 120 (see FIG. 2), and the curved guide panel 130 and the curved glass cover bottom 150 which modularize the curved liquid crystal panel 110 and the curved backlight unit 120.

Figure 4:
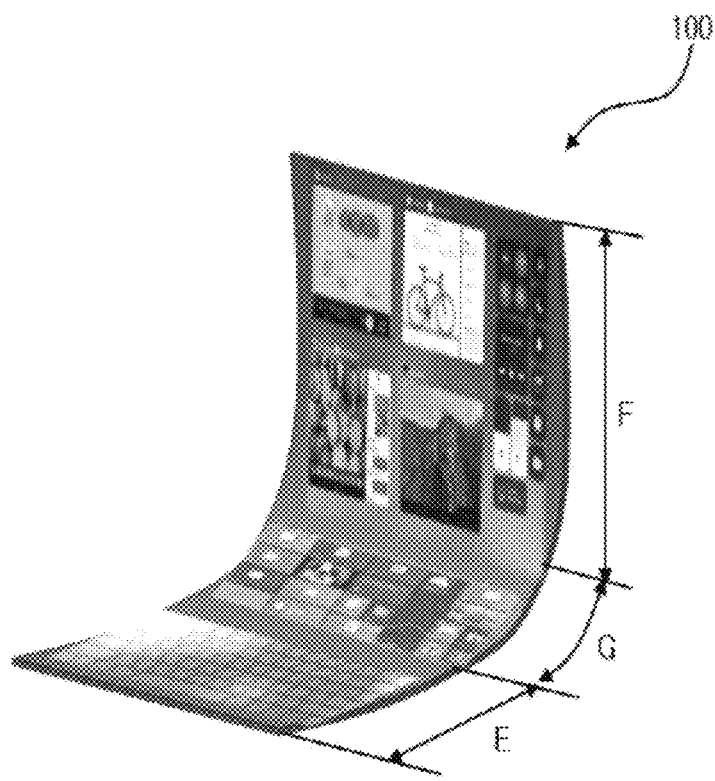
FIG. 4 is a schematic view illustrating a curved LCD device formed in a finished product type according to the embodiment of the present invention.
Figure 5A:
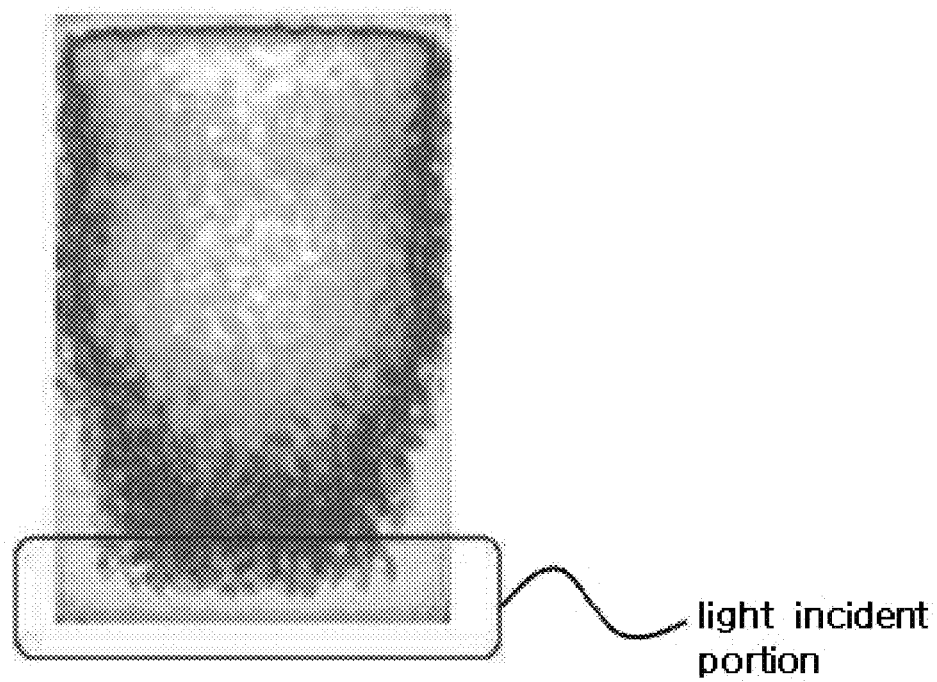
FIGS. 5A to 5B are views showing a simulation result in which a brightness of light emitted from a glass light guide plate is measured according to an angle between the first and second flat sections.
Figure 5B:
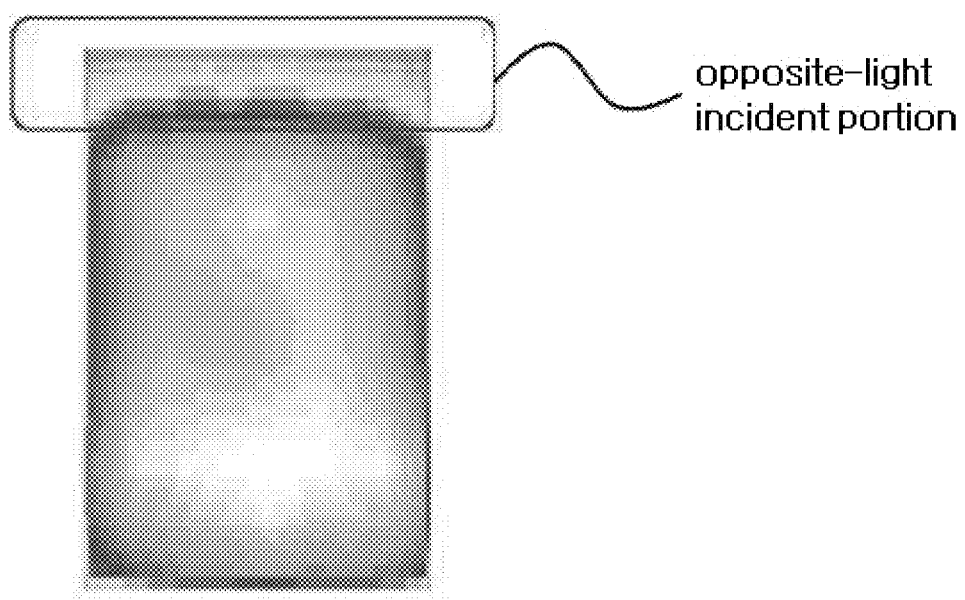

FIG. 4 is a schematic view illustrating the curved LCD device formed in a finished product type according to the embodiment of the present invention, and FIGS. 5A to 5B are views showing a simulation result in which a brightness of light emitted from the glass light guide plate is measured according to an angle between the first and second flat sections.

As illustrated in the drawings, since each of the curved liquid crystal panel 110 (see FIG. 3B), the curved backlight unit 120 (see FIG. 2), and the curved guide panel 130 (see FIG. 3B), and the curved glass cover bottom 150 (see FIG. 3B), which modularize the curved liquid crystal panel 110 and the curved backlight unit 120, includes the first and second flat sections E and F and the curved section G which connects the first and second flat sections E and F, the back surface of the first flat section E is positioned to be pressed against the ground surface, the third and fourth edges formed in the longitudinal direction can vertically fixedly stand the curved LCD device 100.

Particularly, in the curved LCD device 100 according to the embodiment of the present invention, since the outer sides of the first and second vertical portions 131*a* and 131*b* of the curved guide panel 130 (see FIG. 3B) are painted, plated, or coated in black or specific color, and the back surface of the curved glass cover bottom 150 (see FIG. 3B) formed of a glass material is also painted, plated, or coated in black or specific color, the curved guide panel 130 (see FIG. 3B) itself and the curved glass cover bottom 150 (see FIG. 3B) itself can be formed as an exterior of a product.

Accordingly, since the curved LCD device 100 according to the present invention may not need a front cover (not shown) and a rear cover (not shown) as separate covers and further may not need a support (not shown), the curved LCD device 100 can be realized to have a lighter weight, a smaller thickness and a narrower bezel, and can be realized to have a differentiated design when compared to a conventional TV set or monitor.

Recently, a design and an interior have been differentiated and individual personalities have been diversified. Even when the curved LCD device 100 according to the present invention can have a larger screen than a small mobile device such as a smartphone and a tablet personal computer (PC), the curved LCD device 100 can easily be moved and used in another place as well as being used in a fixed place, and thus the curved LCD device 100 can satisfy needs of users.

Particularly, since the curved LCD device 100 according to the embodiment of the present invention further includes the curved section G and the second flat section F along the third and fourth edges in the longitudinal direction, a user can have a most optimum visual angle when compared to a structure in which only the curved section G is positioned above the first flat section E.

The curved LCD device 100 according to the embodiment of the present invention can realize one large image on the first and second flat sections E and F and the curved section or, as illustrated in the drawings, different images can also be realized to be displayed on the first flat section E, the second flat section F, and the curved section G.

In addition, in the drawings, although various input devices, such as a keyboard, a mouse, a trackball, a joystick, and a digitizer, are formed at the first flat section E to provide an interface for a user, the input devices can be positioned in any position required by the user in the curved LCD device 100.

To this end, a touch panel (not shown) may also further be positioned above the curved LCD device 100.

Meanwhile, in the curved LCD device 100 according to the embodiment of the present invention, since the connecting member 116 (see FIG. 2) and the PCB 117 (see FIG. 2) connected to the curved liquid crystal panel 100 (see FIG. 3B) are positioned at the first edge of the curved liquid crystal panel 100 (see FIG. 3B) corresponding to the first flat section E, the PCB 117 (see FIG. 2) is positioned to be pressed against the back surface of the curved glass cover bottom 150 (see FIG. 3B) corresponding to the first flat section E.

In addition, since the LED assembly 129 (see FIG. 3A) of the curved backlight unit 120 (see FIG. 2) is positioned at the first edge of the curved guide panel 130 (see FIG. 3A) corresponding to the first flat section E, the LED housing 128 (see FIG. 3A) is positioned below the curved glass cover bottom 150 (see FIG. 3B) at the first flat section E, and thus a thickness D1 (see FIG. 3A) of the first flat section E is greater than a thickness D2 (see FIG. 3B) of the curved section G and the second flat section F.

Accordingly, since the back surface of the first flat section E is closely adhered to the ground surface and vertically fixedly stands, the curved LCD device 100 more stably vertically fixedly stands.

In addition, the curved LCD device 100 according to the embodiment of the present invention has a small thickness corresponding to the thickness D2 (see FIG. 3B) of the curved section G and the second flat section F excluding the first flat section E.

As described above, in the curved LCD device 100 according to the embodiment of the present invention, since the light guide plate of the curved backlight unit 120 (see FIG. 2) is formed of the glass light guide plate 123 (see FIG. 3B) which has a high rigidity, the curved LCD device 100 can have a predetermined curvature. Therefore, since a modularization frame having a high rigidity for withstanding a repulsive force due to bending of the light guide plate is not needed, the curved LCD device 100 may have a light weight and a small thickness.

In addition, in the curved LCD device 100 according to the embodiment of the present invention, since each of the curved liquid crystal panel 110 (see FIG. 3B), the curved backlight unit 120 (see FIG. 2), and the curved guide panel 130 (see FIG. 3B) and the curved glass cover bottom 150 (see FIG. 3B), which modularize the curved liquid crystal panel 110 and the curved backlight unit 120, includes the first and second flat sections E and F in a flat state, and the curved section G which connects the first and second flat sections E and F, the back surface of the first flat section E is positioned to be pressed against the ground surface, and the third and fourth edges formed in the longitudinal direction can vertically fixedly stand the curved LCD device 100.

In addition, since the curved guide panel 130 (see FIG. 3B) and the curved glass cover bottom 150 (see FIG. 3B) forms an exterior of a product, a front cover (not shown) and a rear cover (not shown) as additional external covers are not needed. In addition, a support (not shown) is also not needed. Thus, the curved LCD device 100 can have a light weight, a small thickness and a narrow bezel, and can have a differentiated design when compared to a conventional TV and a monitor.

Therefore, a process can be simplified, and a process cost can also be reduced.

Meanwhile, in the curved LCD device 100 according to the embodiment of the present invention, an angle between the first flat section E and the second flat section F may be in the range of 120° to 145°. In a case that the angle between the first flat section E and the second flat section F is 120° or less, as illustrated in FIG. 5A, a light incident portion of the first flat section E may have a dark portion.

In addition, in a case that the angle between the first flat section E and the second flat section F is 145° or more, as illustrated in FIG. 5B, an opposite-light incident portion of the second flat section F may have a dark portion. The opposite-light incident portion is defined as a portion located at a side opposite to a side at which the light incident portion is located.

Accordingly, it is preferable that the angle between the first flat section E and the second flat section F satisfies to be in the range of 120° to 145°.

In addition, it is preferable that a curvature of the curved section G is 10R or more. Here, R refers to a curvature R, and may be defined as a radius of curvature which refers to a curvature of an arc of a circle having a radius R.

Here, 10R refers to an arc having a radius of 0.01 meters.

In a case that a curvature of the curved section G is less than 10R, since a light transfer effect is reduced at the curved section G of the glass light guide plate 123 (FIG. 3B), it is preferable that the curvature of the curved section G is 10R or more.

As described above, since a light guide plate of a curved backlight unit is formed of a glass light guide plate according to the present invention, a modularization frame having a high rigidity for withstanding a repulsive force due to bending of the light guide plate is not required, and thus there is an effect in that a lightweight and thin curved LCD device can be formed.

In addition, since each of a curved liquid crystal panel, the curved backlight unit, and a curved guide panel and a curved glass cover bottom, which modularize the curved liquid crystal panel and the curved backlight unit, includes first and second flat sections, and a curved section connecting the first and second flat sections, a back surface of a first flat section is positioned to be pressed against a ground surface, and thus third and fourth edges formed in a longitudinal direction can fixedly vertically stand. In addition, since the curved guide panel and the curved glass cover bottom form an exterior of a product, a front cover and a rear cover which are additional external covers are not required. In addition, since a support is not required, there is an effect in that the lightweight and thin curved LCD device having a narrow bezel can be formed.

In addition, there is an effect in that a differentiated design can be achieved when compared to a conventional TV set and a monitor, and thus there are effects in that a process thereof can be simplified and a process cost can be reduced.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed is:

1. A curved liquid crystal display device, comprising:
    a curved liquid crystal panel comprising:
        a first flat section and a second flat section that are flat in a longitudinal direction; and
        a curved section between the first and second flat sections;
    a curved backlight unit disposed under the curved liquid crystal panel, the curved backlight unit comprising:
        a glass light guide plate comprising:
            first and second flat sections that are flat in the longitudinal direction; and
            a curved section between the first and second flat sections of the glass light guide plate, and
        a light emitting diode (LED) assembly positioned at the first flat section and one side of a light incident surface of the glass light guide plate;
    a curved guide panel surrounding edges of the curved liquid crystal panel and the curved backlight unit, the curved guide panel comprising:
        first and second flat sections that are flat in the longitudinal direction; and
        a curved section between the first and second flat sections of the curved guide panel;
    a curved glass cover bottom disposed at a back surface of the curved backlight unit, the curved glass cover bottom comprising:
        first and second flat sections that are flat in the longitudinal direction; and
        a curved section between the first and second flat sections of the curved glass cover bottom; and
    an LED housing disposed at a back surface of the first flat section of the curved glass cover bottom, wherein the LED housing is disposed only at the first flat section, and not at the curved section,
    wherein the curved guide panel and the curved glass cover bottom are outermost structures of the curved liquid crystal display device, and
    wherein the light emitting diode (LED) assembly includes a printed circuit board (PCB) protruding under the back surface of the first flat section of the curved glass cover bottom and in contact with the LED housing.

2. The curved liquid crystal display device of claim 1, wherein the first and second flat sections, and the curved section of the curved liquid crystal panel, the curved backlight unit, the curved guide panel, and the curved glass cover bottom correspond to overlap with each other, respectively.

3. The curved liquid crystal display device of claim 1, wherein a back surface of the first flat section of the curved glass cover bottom is supported on a ground surface such that the curved liquid crystal display device vertically fixedly stands in the longitudinal direction.

4. The curved liquid crystal display device of claim 1, wherein an angle between the first flat section and the second flat section of each of the curved liquid crystal panel, the glass light guide plate, the curved guide panel and the curved glass cover bottom is in a range of 120° to 145°.

5. The curved liquid crystal display device of claim 1, wherein the curved section of each of the curved liquid crystal panel, the glass light guide plate, the curved guide panel and the curved glass cover bottom has an arc shape with a radius of at least 0.01 meter.

6. The curved liquid crystal display device of claim 1, wherein the curved backlight unit further comprises:
    a reflective plate positioned under the glass light guide plate; and
    an optical sheet disposed above the glass light guide plate.

7. The curved liquid crystal display device of claim 1, wherein the LED housing and the PCB are made of a metal material.

8. The curved liquid crystal display device of claim 1, wherein a printed circuit board connected to a first edge of the curved liquid crystal panel through a connecting member is placed on a back surface of the first flat section of the curved glass cover bottom.

9. The curved liquid crystal display device of claim 6, wherein:
    the curved guide panel includes a first vertical portion, which guides an outer side of the LED assembly, and a first horizontal portion which is perpendicularly bent from the first vertical portion and covers and hides an upper region of the LED assembly, the first vertical and horizontal portions located at a first edge of the curved guide panel; and
    the curved guide panel includes a second vertical portion which surrounds an edge of the curved backlight unit, and a second horizontal portion which protrude inward from the second vertical portion, the second vertical and horizontal portions located at each of second to fourth edges of the curved guide panel.

10. The curved liquid crystal display device of claim 9, wherein an edge of a back surface of the curved liquid crystal panel is supported on the first horizontal portion and the second horizontal portion, and is attached to the first horizontal portion and the second horizontal portion by a first adhesive member.

11. The curved liquid crystal display device of claim 9, wherein the curved glass cover bottom is attached to a back surface of the second horizontal portion by a second adhesive member.

12. A curved liquid crystal display device, comprising:
a first flat section and a second flat section that are flat in a longitudinal direction; and
a curved section between the first and second flat sections,
wherein the first flat section comprises a light emitting diode (LED) housing, a first portion of a curved glass cover bottom, a first portion of a curved guide panel, a first portion of a curved backlight unit, and a first portion of a curved liquid crystal panel, stacked sequentially,
wherein the second flat section comprises a second portion of the curved glass cover bottom, a second portion of the curved guide panel, a second portion of the curved backlight unit, and a second portion of the curved liquid crystal panel stacked sequentially,
wherein the curved section comprises a curved portion of the curved glass cover bottom, a curved portion of the curved guide panel, a curved portion of the curved backlight unit, and a curved portion of the curved liquid crystal panel stacked sequentially,
wherein the curved backlight unit comprises a light emitting diode (LED) assembly, a curved glass light guide plate, and the curved guide panel and the curved glass cover bottom are outermost structures of the curved liquid crystal display device,
wherein at least one of the curved glass cover bottom and the curved guide panel is painted, plated, or coated in black or a specific color, and
wherein the light emitting diode (LED) assembly includes a printed circuit board (PCB) protruding under a back surface of the curved glass cover bottom and in contact with the LED housing wherein the LED housing is disposed only at the first flat section, and not at the curved section.

13. The curved liquid crystal display device of claim 3, wherein the back surface of the first flat section of the curved glass cover bottom is pressed against the ground surface.

14. The curved liquid crystal display device of claim 12, wherein a back surface of the first portion of the curved glass cover bottom is pressed against a ground surface.

15. The curved liquid crystal display device of claim 1, wherein the first flat section, the second flat section and the curved section of the curved liquid crystal panel display different images.

16. The curved liquid crystal display device of claim 12, wherein the first portion, the second portion and the curved portion of the curved liquid crystal panel display different images.

17. The curved liquid crystal display device of claim 1, wherein outer sides of a first vertical portion and a second vertical portion of the curved guide panel are painted, plated, or coated in black or a specific color.

18. The curved liquid crystal display device of claim 12, wherein outer sides of a first vertical portion and a second vertical portion of the curved guide panel are painted, plated, or coated in black or a specific color.

* * * * *